United States Patent [19]

Lipner

[11] 3,935,106

[45] Jan. 27, 1976

[54] WATER FILTER ASSEMBLY

[76] Inventor: Herbert D. Lipner, 166 26th St., Park Forest, Ill. 60466

[22] Filed: July 19, 1974

[21] Appl. No.: 490,136

Related U.S. Application Data

[63] Continuation-in-part of Ser. No. 435,849, Jan. 23, 1974, abandoned.

[52] U.S. Cl. ............... 210/232; 210/418; 210/436; 210/444; 210/472
[51] Int. Cl.² ........................................ B01D 29/10
[58] Field of Search .......... 210/135, 232, 234, 240, 210/418, 421, 424, 431, 436, 444, 472

[56] References Cited
UNITED STATES PATENTS

| 261,119 | 7/1882 | Adams | 210/443 |
|---|---|---|---|
| 2,532,177 | 11/1950 | Maunula | 210/135 X |
| 2,544,244 | 3/1951 | Yokes | 210/234 |
| 3,485,371 | 12/1969 | Castantini | 210/135 |
| 3,746,171 | 7/1973 | Thomsen | 210/234 |
| 3,777,889 | 12/1973 | Henderson | 210/135 |

Primary Examiner—Theodore A. Granger

[57] ABSTRACT

A low cost water filter apparatus including a valve rotor rotatable within a valve housing which rotor may be rotated within the valve housing when necessary for the purpose of engaging a bypass safety feature, or for the purpose of shutting off the flow of water through the filter unit prior to changing the filter element.

4 Claims, 7 Drawing Figures

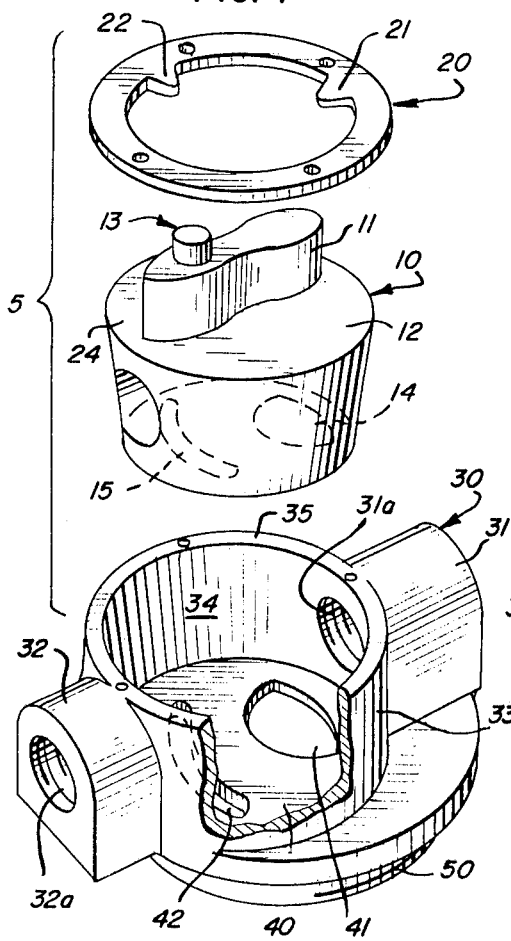
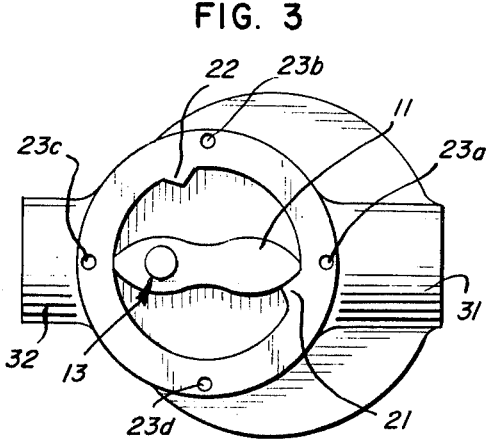
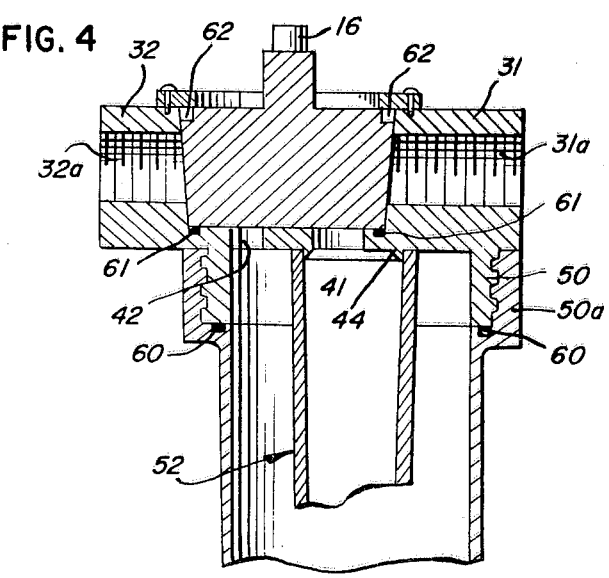
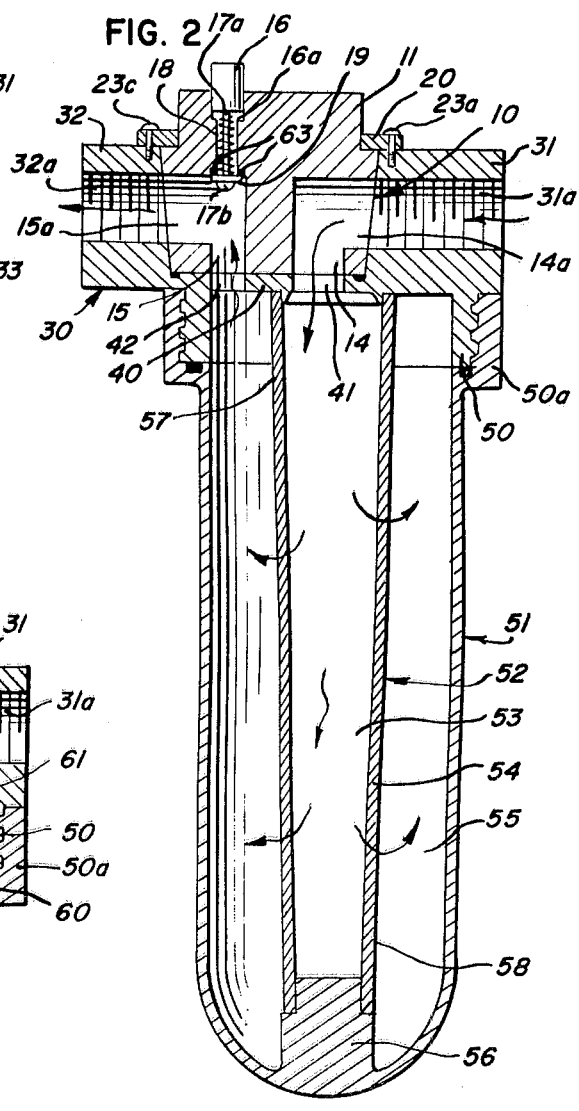

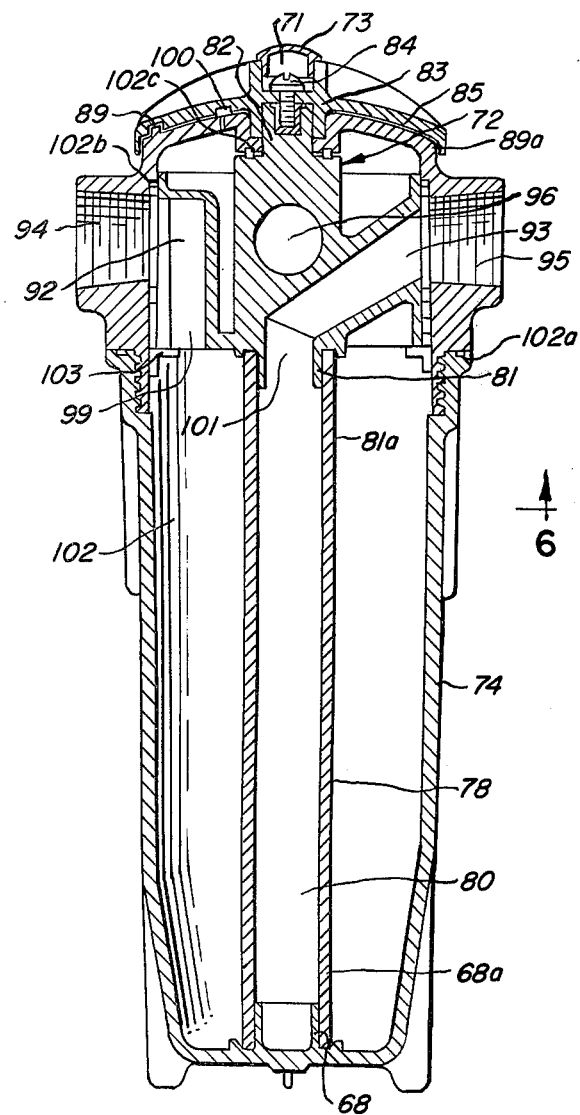
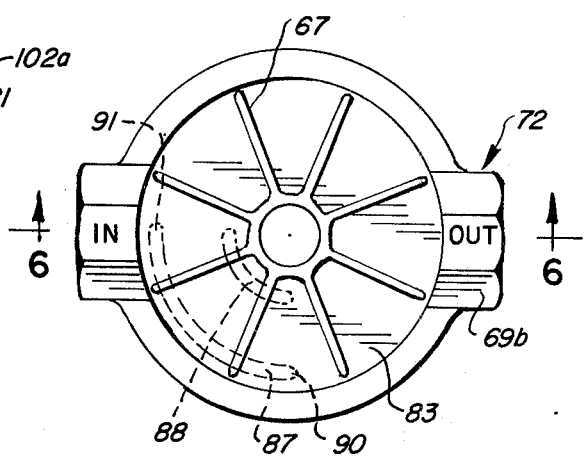
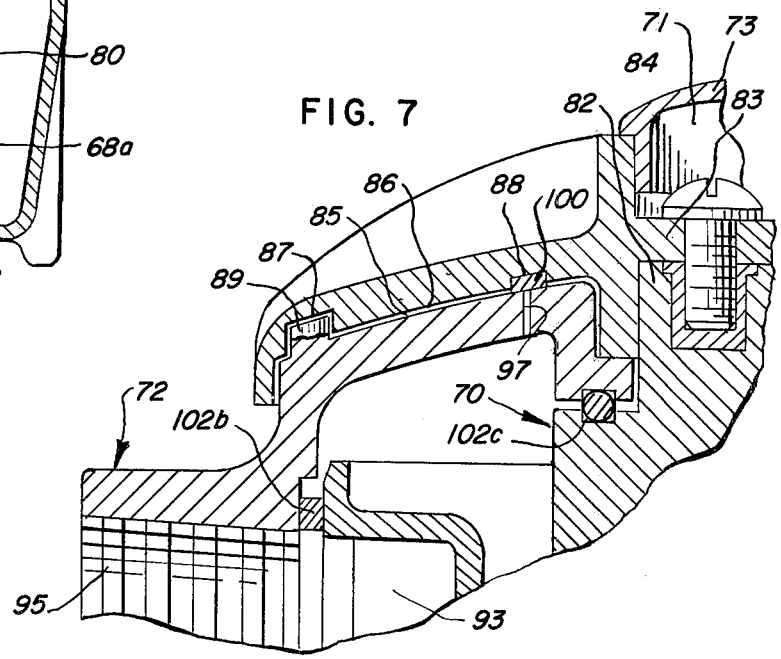

3,935,106

WATER FILTER ASSEMBLY

This patent application is a continuation-in-part of United States patent application Ser. No. 435,849 filed on Jan. 23, 1974, now abandoned.

BACKGROUND OF THE INVENTION

The present invention relates generally to devices for filtering liquids and more specifically to low cost, easily changeable water filter assemblies.

Water filters have been used to filter the entire water stream entering a residence or business to remove particles therein to avoid, e.g., sediment in the water heater, which would in time necessitate costly replacement or repair. Additionally, particles contained in drinking water tend to reduce its palatability. Such filter systems also provide particle-free water for laundry purposes.

A number of disadvantages have, however, been associated with the use of prior art water filtering systems. Formerly, the design of water filter assemblies required the use of two valves on the water line, one before the filter to prevent the flow of water into the filter tank during changing of the filter element and one after the filter to shut off the flow of water from the filter tank, in order to prevent back flow of water from the water line of the user. In prior art devices, in order to change the filter element, both of these valves had to be turned off. This fact made changing the filter element an excessively time consuming operation. A further disadvantage of prior art systems was the fact that the necessity for using two valves entailed an excessive expense in manufacturing, installing and servicing such systems.

SUMMARY OF THE INVENTION

The present invention substantially reduces the problems associated with the use of prior art water filter assemblies by eliminating the necessity for using two separate valves, one to shut off the stream of water entering the filter and the other to prevent back flow of water from the water line. The present invention accomplishes both these functions in one simple rotational operation by the use of a single valve assembly, thus, resulting in a considerable saving to the consumer in the initial cost of the unit, installing the unit and in servicing the unit.

Yet a further advantage of the present invention is the fact that the filter element of the present invention may be easily and quickly changed. Whereas the prior art required the closing of two valves before a filter element could be changed, the present invention requires only a partial rotation of a valve rotor within its housing. The filter element may then be easily changed. A reciprocal rotation of the valve rotor again opens the filter to the incoming and outgoing streams of water to again place the present invention in operating configuration.

Also, the present invention preferably provides for a safety feature which when the rotor is rotated from its filtering position, permits the stream of water from the community line to bypass the filter element, should the filter tank become damaged or otherwise become inoperative. Preferred embodiments of the present invention also include an automatic vacuum relief mechanism to release the vacuum occurring within the filter tank when the rotor is placed in bypass position.

BRIEF DESCRIPTION OF THE DRAWING

FIG. 1 is an exploded perspective view showing the valve assembly elements of one embodiment of the present invention.

FIG. 2 is a side elevation showing the valve assembly in filtering position and further showing by arrows the path of water entering the filter, being filtered and exiting the filter assembly.

FIG. 3 is a top view of one embodiment of the present invention.

FIG. 4 is a fragmented side elevation showing the valve assembly in closed position.

FIG. 5 is a top view of an alternate embodiment of the present invention.

FIG. 6 is a side view taken along line 6-6 of FIG. 5.

FIG. 7 is a magnified view of a portion of FIG. 6 showing the automatic vacuum relief mechanism of the present invention.

DESCRIPTION OF THE PREFERRED EMBODIMENTS

Referring to FIG. 1, valve assembly 5 comprises a valve rotor 10 fitting into a generally T-shaped valve housing 30, which has inlet and outlet portions 31, 32, which are disposed diametrically opposite each other on exterior surface 33 of cylindrical shaped chamber 34 of T-shaped valve housing 30. Inlet and outlet portions 31, 32 have centrally located horizontal inlet and outlet openings 31a and 32a respectively.

In one embodiment, bottom plate 40, defining vertical axial inlet and radial outlet openings 41, 42 otherwise sealingly encloses the bottom of frustoconical shaped chamber 34, which is shaped to receive valve rotor 10. In alternative embodiments such as those described in FIGS. 5-7, infra, such chambers, rather being frustoconical are cylindrical in shape.

Valve rotor 10, having handle 11 mounted on upper surface 12 thereof, has pressure release valve 13 mounted therein. Referring now to FIGS. 1 and 2, just as with housing 30, rotor 10 also has horizontal entering and exiting openings 14a, 15a horizontally positioned therein so as to communicate with horizontal entering and exiting openings 31a, 32a of housing 30 when valve assembly 5 is in the filtering position. Vertical axial and radial bores 14, 15 of rotor 10 also communicate with axial and radial openings 41, 42 in bottom plate 40 of valve housing 30 when valve assembly 5 is in the filtering position.

T-shaped housing 30 has threaded portion 50 on its underside for attaching the filter tank thereto. Stop ring 20, whose function is examined in more detail in connection with FIG. 3, infra, is positioned atop periphery 24 of rotor 10 when the present invention is in its fully assembled state, such that, when one turns handle 13 of rotor 10, valve assembly 5 may be placed thereby in either filtering or non-filtering position.

Referring to FIG. 2, which shows the present invention in its fully assembled state, rotor 10 is shown in the filtering position. Horizontal entering and exiting openings 14a, 15a of rotor 10 are shown communicating with entering and exiting openings 31a and 32a respectively of T-shaped housing 30. Axial and radial bores 14, 15 further communicate with axial and radial openings 41, 42 in bottom plate 40 of housing 30.

In the embodiment shown in FIGS. 1-4, pressure release valve 13 in handle 11 of rotor 10 has a relief plunger 16 fitting and received within valve chamber 16a. Threadably attached to the underside of plunger 16 is plunger screw 17, about shaft 17a of which plunger coil spring 18 is axially mounted. Washer 19, mounted on screw 17 between screw head 17b and inside surface 15b of radial bore 15, seals radial opening 15 and prevents leakage of the water stream therefrom. Valve cover ring 20 held by screws 23a-d secures rotor 10 in place and prevents its accidental loss or removal from the system, which would result in flooding.

Threadably attached to threaded portion 50 of housing 30 is threaded portion 50a of filter tank 51, which contains hollow cylindrical or semi-frustoconical fibrous filter element 52. Input end 57 of filter element 52 communicates with axial inlet bore 14 of rotor 10. Support end 58 rests upon projection 56, which is shaped to receive and hold it.

Arrows symbolically illustrate the path of water being filtered by passing through filter element 52 of the present invention. Incoming water goes through horizontal entering opening 31a of housing 30, continues through lateral entering opening 14a of rotor 10, goes through vertical axial bore 14 of rotor 10 and then through axial opening 41 in bottom plate 40 of housing 30 into central filtering cavity 53 of filter element 52. The water stream is then filtered through fibrous walls 54 of filter element 52 into collecting chamber 55 within filter tank 51 and exits therefrom through radial opening 42 in bottom plate 40 of housing 30, continuing through horizontal exiting opening 15a of rotor 10, and finally through horizontal exiting opening 32a of housing 30 into the water line of the consumer.

Collecting chamber 55 may be filled with charcoal. It is also contemplated that in other embodiments of the present invention the direction of flow of the water stream to be filtered may be reversed from that shown in FIGS. 1–4. FIGS. 5–7 hereof illustrate this alternative direction of flow of water entering and exiting the filter unit. Also, if desired central cavity 53 may be filled with charcoal, rather than using collecting chamber 55 for this purpose.

Referring to FIG. 3, showing a top view of T-shaped housing 30, which is shaped to receive rotor 10, inlet and outlet portions 31, 32 are disposed diametrically opposite each other about rotor 10. Valve rotor 10 is mounted off center and has plug handle 11 mounted atop rotor 10, containing release valve 13 therein.

Stop ring 20, with open and close restraining projections 21, 22 respectively, is positioned over rotor 10 such that handle 11 may be moved no further than the open or closed positions respectively. In the embodiment shown, stop ring 20 is secured by four evenly spaced screws 23a-d to upper surface 35 of frustoconical shaped chamber 34, as shown in FIG. 1.

Referring to FIG. 4, valve assembly 5 of the present invention is shown in its closed position. Rotor 10 mounted in housing 30 has been turned 90° from the positions shown in FIGS. 2 and 3. Entering and exiting openings 31a, 32a of housing 30 are not in communication with inlet and outlet openings 14, 15 of rotor 10 (not shown in FIG. 4). Hence, it is not possible for water to enter or leave filter tank 51. In this closed position, filter element 52 of the present invention may be easily changed merely by unscrewing threaded portion 50a of filter tank 41 from threaded portion 50 of housing 30. Before this may be easily done, however, internal vacuum is relieved by pushing down plunger 16 of release valve 13 which is mounted atop handle 11 of valve rotor 10, as detailed in FIG. 2.

After the filter element has been changed and a new filter element has been inserted around lip portion 44 projecting outwardly from under surface 45 of bottom plate 40, filter tank threaded portion 50a is then rethreaded onto threaded portion 50 of housing 30. Rotor 10 is then reciprocally turned 90° such that entering and exiting openings 14a, 15a are once again in communication with entering and exiting openings 31, 32 of housing 30, as shown in FIG. 2. When this communication occurs, axial and radial bores 14, 15 will also be in communicating relationship with axial and radial openings 41, 42 of bottom plate 40. In this, the open position, the water stream is again free to enter and exit filter tank 51 of the present invention.

The various detachable parts of the present invention may be sealed by O-rings. In the embodiment shown in FIG. 4, O-ring 60 positioned in cavity 60a serves as a seal between threaded portion 50 of housing 30 and the corresponding threaded portion 50a of filter tank 41. Similarly, O-ring 61 serves as a seal between the bottom portion of rotor 10 and housing 30. The upper portion of rotor 10 and housing 30 are sealed by O-ring 62. Referring to FIG. 2, O-ring 63 serves as a seal between washer 19 in chamber 16a and rotor 10.

As described more fully in connection with an alternative embodiment described hereinbelow, a through passage may be provided in valve rotor 10 such that, when the rotor is rotated to a position where the through passage communicates with horizontal entering and exiting openings 31a, 32a of housing 30, water will flow straight through housing 30 but cannot flow into the filter because the valve housing is sealed. This feature would permit filter tank 51 to be removed easily and safely for cleaning and changing of filter element 52, but does not necessitate a shut off of the water supply.

FIGS. 5, 6 and 7 illustrate an alternative preferred embodiment of the present invention, which differs from the above described embodiment in certain design features and includes certain additional features, but operates according to the same basic principles.

Referring to FIG. 6, valve rotor 70 is contained within valve housing 72 which is secured to filter tank 74 by threads 76. Tank 74 contains filter element 78, the walls of which define a central cavity 80. Filter element 78 is positioned inside tank 74 by projection 68 thereof at its bottom or support end 68a and by sump 81 of rotor 70 at its top end 81a.

Referring to FIGS. 6 and 7, valve rotor 70 is attached at its top 82 to cap 83 by bolt 84 in depression 71, such that if cap 83 is rotated, rotor 70 is also rotated thereby. Depression 71 is topped by cover 73 in the upper surface of cap 83. Cap 83 fits snugly over the top surface 85 of housing 72. Cap 83 preferably has ribbed projections 67 on its upper surface for ease of gripping and rotating. Cap 83 has on its under surface 86 a semicircular support groove 87 and a semicircular vacuum relief groove 88, as illustrated in FIG. 5. Support groove 87 accomodates support projection 89 and also serves to restrict the arc of rotation of valve rotor 70 to a 90° rotation, the extremes 90, 91 of which correspond respectively to the filtering and bypass positions of rotor 70. In alternative embodiments, a matching diametrically disposed auxiliary support groove 87a with accompanying auxiliary support projection 89a may be provided for balance.

Cap 83 serves the dual function of supporting rotor 70 to which cap 83 is fixedly secured by bolt 84, as well as transmitting rotation to rotor 70 when cap 83 itself is manually rotated. Valve rotor support ring 103 disposed under rotor 70 also serves as additional support for rotor 70 within housing 72. Ring 103 preferably has two or more ear-like radially extending projections which fit into recesses (not shown) in housing 72. Ring 103 thus serves a purpose analogous to that of bottom plate 40 in the alternative embodiment of the present invention illustrated in FIGS. 1-4 hereof.

Housing 72 has inlet and outlet portions 69a and 69b, as shown in FIG. 5 which contain respectively entering and exiting openings 94, 95 therein. Rotor 70 has entering and exiting openings 92, 93 on diametrically opposed sides thereof which communicate with entering and exiting openings 94, 95 of housing 72 when the rotor is in the filtering position, as it is shown in FIG. 6.

Bypass opening 96 is provided in rotor 70 such that, if rotor 70 is rotated 90° from the operating position shown in FIG. 6, bypass opening 96 will communicate with entering and exiting openings 94, 95 of housing 72. The water will then pass straight through the valve, with no water entering filter tank 74. Rotor 70 is placed in the bypass position when the filter element is to be changed, should the filter tank become damaged, or should the filter element become clogged with foreign matter.

Vacuum relief groove 88 accomodates vacuum seal 100, which is fixedly secured to the inner surface thereof. Vacuum seal 100 covers and seals vacuum opening 97 which extends through housing 72 in the upper surface 86 thereof. Vacuum opening 97 is preferably approximately 0.020 inches in diameter.

When the rotor 70 is placed in bypass position by rotating cap 83, vacuum seal 100, which is attached to the under surface of cap 83 in vacuum relief groove 88, automatically uncovers vacuum opening 97. Atmospheric air then enters the filter tank to releave the vacuum created therein, to provide thereby for easier disassembly of the filter tank from the housing.

Radial bore 99 in rotor 70 communicates with entering opening 92 thereof. Thus, when rotor 70 is in the filtering position, water enters housing 72 at entering opening 94 and passes into communicating entering opening 92 of rotor 70. The stream of water then passes downwardly to radial bore 99 where it enters pre-filter chamber 102. After passing through the walls of filter 78, the then filtered water continues upwardly in internal filter cavity 80. Next, the filtered water passes through axial bore 101 in the bottom surface of rotor 70, and then is directed diagonally upward through exiting opening 93 of rotor 70 and finally through exiting opening 95 of housing 72 ready for use.

Similarly to the above described embodiment, O-rings 102a, 102b and 102c are preferably used to seal the connections between the various elements of the filter unit.

The present invention may be made in a variety of sizes to corresond to the volume of water to be filtered. The housing and filter tank elements of the present invention may be molded of rigid polymeric materials or may be constructed of more permanent materials, such as stainless steel. The rotor element of the present invention is preferably constructed from similar polymeric materials.

The foregoing descriptions have been given for clearness of understanding only, and no unnecessary limitations should be understood therefrom, as modifications will be obvious to those skilled in the art.

What is claimed is:

1. A water filtering apparatus comprising:
    a valve rotor, having an inlet bore and an outlet bore, said inlet and outlet bores communicating respectively with oppositely disposed entering and exiting openings in said rotor;
    a housing for said rotor, said housing having therein housing entering and housing exiting openings corresponding to those of said rotor and communicating therewith when said rotor is in filtering position, positioned such that if said valve rotor be rotated, said rotor entering opening and said rotor exiting opening may be discommunicated thereby from said housing entering opening and said housing exiting opening respectively;
    a filter tank detachably, sealably mounted to said housing;
    a hollow, elongated filter element having permeable walls defining a central cavity, said filter element mounted in said filter tank with one end thereof opening into one said bore of said rotor; and
    automatic vacuum relief means for releasing the vacuum created within said filter tank when said entering and exiting openings of said rotor have been discommunicated from said entering and exiting openings of said housing, whereby said apparatus may be more easily disassembled; said automatic vacuum relief means comprising a vacuum opening in said filter tank communicating said filter tank with the ambient atmosphere; and a vacuum seal covering said vacuum opening when said valve rotor is in filtering position discommunicatable therefrom when said valve rotor is rotatably positioned in bypass configuration.

2. A water filtering apparatus comprising:
    a valve rotor, having a radially disposed inlet bore and an axially disposed outlet bore, said inlet and outlet bores communicating respectively with oppositely disposed rotor entering and rotor exiting openings;
    a housing for said rotor, said housing having therein housing entering and housing exiting openings corresponding to said rotor entering and rotor exiting openings and communicating therewith when said rotor is in filtering position, positioned such that if said valve rotor be rotated said rotor entering opening and said rotor exiting opening may be discommunicated thereby from said housing entering opening and said housing exiting opening respectively;
    a filter tank detachably, sealably mounted to said housing; and
    a hollow elongated filter element having permeable walls defining a central cavity, said filter element mounted in said filter tank with one end thereof opening directly into and communicating directly with said axially disposed outlet bore of said rotor, whereby filtered water in said central cavity may unimpedably flow therefrom through said outlet bore of said rotor.

3. An apparatus as claimed in claim 2 wherein:
    said exiting opening in said rotor extends diagonally from said outlet bore in said rotor to communicate said outlet bore with said exiting opening of said housing.

4. An apparatus as claimed in claim 2 wherein:

said valve rotor further includes bypass means for directly communicating through said rotor said entering and exiting openings in said housing, such that when so communicated no water may enter said filter tank, whereby a safety feature is incorporated therein to permit unfiltered water to be used should said filter tank become inoperative and to permit said unfiltered water to be used when said filter element is changed.

* * * * *